United States Patent
Chiu et al.

(10) Patent No.: US 9,338,458 B2
(45) Date of Patent: May 10, 2016

(54) VIDEO DECODING APPARATUS AND METHOD FOR SELECTIVELY BYPASSING PROCESSING OF RESIDUAL VALUES AND/OR BUFFERING OF PROCESSED RESIDUAL VALUES

(75) Inventors: Min-Hao Chiu, Hsinchu (TW); Chia-Yun Cheng, Hsinchu County (TW); Chun-Chia Chen, Hsinchu (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 278 days.

(21) Appl. No.: 13/216,273

(22) Filed: Aug. 24, 2011

(65) Prior Publication Data

US 2013/0051461 A1  Feb. 28, 2013

(51) Int. Cl.
| | |
|---|---|
| H04N 7/26 | (2006.01) |
| H04N 19/124 | (2014.01) |
| H04N 19/129 | (2014.01) |
| H04N 19/12 | (2014.01) |

(52) U.S. Cl.
CPC ............. *H04N 19/124* (2014.11); *H04N 19/12* (2014.11); *H04N 19/129* (2014.11)

(58) Field of Classification Search
CPC .... H04N 19/129; H04N 19/124; H04N 19/12
USPC ....................... 375/240.12, 240.25
See application file for complete search history.

(56) References Cited

U.S. PATENT DOCUMENTS

| | | | |
|---|---|---|---|
| 7,613,345 B2 | 11/2009 | Kajiwara | |
| 2003/0206595 A1* | 11/2003 | Peng et al. | 375/240.25 |
| 2006/0083308 A1 | 4/2006 | Schwarz et al. | |
| 2006/0233254 A1* | 10/2006 | Lee et al. | 375/240.16 |
| 2006/0262985 A1* | 11/2006 | Chen et al. | 382/240 |
| 2007/0014349 A1* | 1/2007 | Bao et al. | 375/240.1 |
| 2007/0230564 A1* | 10/2007 | Chen et al. | 375/240.01 |
| 2008/0013633 A1* | 1/2008 | Ye et al. | 375/240.24 |
| 2008/0025396 A1* | 1/2008 | Tasaka et al. | 375/240.12 |
| 2008/0075173 A1* | 3/2008 | Jain et al. | 375/240.25 |
| 2009/0122867 A1* | 5/2009 | Mauchly et al. | 375/240.16 |
| 2010/0046612 A1* | 2/2010 | Sun et al. | 375/240.02 |
| 2010/0046636 A1* | 2/2010 | Hatabu | 375/240.25 |
| 2010/0232720 A1 | 9/2010 | Tsai | |
| 2011/0150072 A1* | 6/2011 | Han | 375/240.01 |

(Continued)

FOREIGN PATENT DOCUMENTS

| | | |
|---|---|---|
| CN | 101005620 A | 7/2007 |
| CN | 101014129 A | 8/2007 |
| TW | 201032597 | 9/2010 |

(Continued)

*Primary Examiner* — Christopher S Kelley
*Assistant Examiner* — Zhihan Zhou
(74) *Attorney, Agent, or Firm* — Winston Hsu; Scott Margo

(57) ABSTRACT

An exemplary video decoding apparatus includes a first decoding unit configured for decoding a first encoded block to generate first residual values, a first detecting unit configured for detecting whether all of the first residual values have a same first value, a first processing circuit configured for processing the first residual values to generate first processed residual values, and a second processing circuit configured for generating a decoded block corresponding to the first encoded block. When all of the first residual values have the same first value, the first detecting unit controls the second processing circuit to generate the decoded block without referring to the first processed residual values.

18 Claims, 7 Drawing Sheets

(56) References Cited

U.S. PATENT DOCUMENTS

2011/0182362 A1* 7/2011 Kim et al. ............ 375/240.16
2012/0106633 A1* 5/2012 Kim et al. ............ 375/240.12

FOREIGN PATENT DOCUMENTS

TW 201105145 2/2011
WO WO 2010035993 A2 * 4/2010

* cited by examiner

VIDEO DECODING APPARATUS AND METHOD FOR SELECTIVELY BYPASSING PROCESSING OF RESIDUAL VALUES AND/OR BUFFERING OF PROCESSED RESIDUAL VALUES

BACKGROUND

The disclosed embodiments of the present invention relate to decoding blocks of an encoded frame, and more particularly, to a video decoding apparatus for selectively bypassing processing of residual values and/or buffering of processed residual values by detecting whether all of the residual values have the same value (e.g., zero) and related video decoding method thereof.

Regarding some coding standards, such as MPEG 1/2/4, WMV, H.264, RM, AVS, etc., a coded block pattern (CBP) may be used to indicate which blocks within a macroblock have non-zero residual values. For example, in accordance with H.264 standard, a CBP may include 6 bits. When one bit of the CBP is equal to zero, it means that block(s) indicated by the CBP bit should have no non-zero residual value. Thus, decoding of such block(s) is allowed to be skipped. For example, when processing a block indicated by a CBP bit equal to zero, the decoder may skip the inverse scan, the inverse quantization, and the inverse transform. However, under certain conditions, a block indicated by a CBP bit equal to one may contain all zero residual values. Hence, even thought the block does not have any non-zero residual value, the decoding operation, including the inverse scan, the inverse quantization, and the inverse transform, is not skipped. Moreover, a block may include a plurality of sub-blocks. Skipping the decoding of part of the sub-blocks that has all zero residual values is not allowed when a corresponding CBP bit of the block is set to one due to at least one non-zero residual value included in the remaining part of the sub-blocks.

Regarding other coding standards, no CBP is used. Taking the VP8 decoding for example, when processing a block having one DC residual value or all zero residual values, the decoder may skip the inverse scan and the inverse quantization, and do the arithmetic mean in the inverse transform.

Even though a block to be decoded actually contains all zero residual values, it is possible that a conventional decoder does not skip the decoding operation of the block, leading to degraded decoding performance.

SUMMARY

In accordance with exemplary embodiments of the present invention, a video decoding apparatus for selectively bypassing processing of residual values and/or buffering of processed residual values by detecting whether all of the residual values have the same value (e.g., zero) and related video decoding method thereof are proposed to solve the above-mentioned problems.

According to a first aspect of the present invention, an exemplary video decoding apparatus is disclosed. The exemplary video decoding apparatus includes a first decoding circuit, a first processing circuit, and a second processing circuit. The first decoding circuit includes a first decoding unit configured for decoding a first encoded block to generate first residual values, and a first detecting unit configured for detecting whether all of the first residual values have a same first value. The first processing circuit is coupled to the first decoding unit, and configured for processing the first residual values to generate first processed residual values. The second processing circuit is coupled to the first processing circuit and the first detecting unit, and configured for generating a decoded block corresponding to the first encoded block, wherein when all of the first residual values have the same first value, the first detecting unit controls the second processing circuit to generate the decoded block without referring to the first processed residual values.

According to a second aspect of the present invention, an exemplary video decoding method is disclosed. The exemplary video decoding method includes: decoding a first encoded block to generate first residual values; detecting whether all of the first residual values have a same first value by utilizing a detecting unit; and when it is determined that all of the first residual values have the same first value, generating a decoded block corresponding to the first encoded block without referring to first processed residual values configured to be derived from processing the first residual values.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main conception of the present invention is to detect whether all residual values of a block have the same value (e.g., zero), and selectively skip the decoding operation, including the inverse scan, the inverse quantization, and the inverse transform, of the block according to the detection result. For example, the decoder is allowed to bypass/skip the following processing of the residual values and/or buffering of the processed residual values when the block is found having all zero residual values. In this way, the decoding performance is improved. Further details are described hereinafter.

Figure 1:
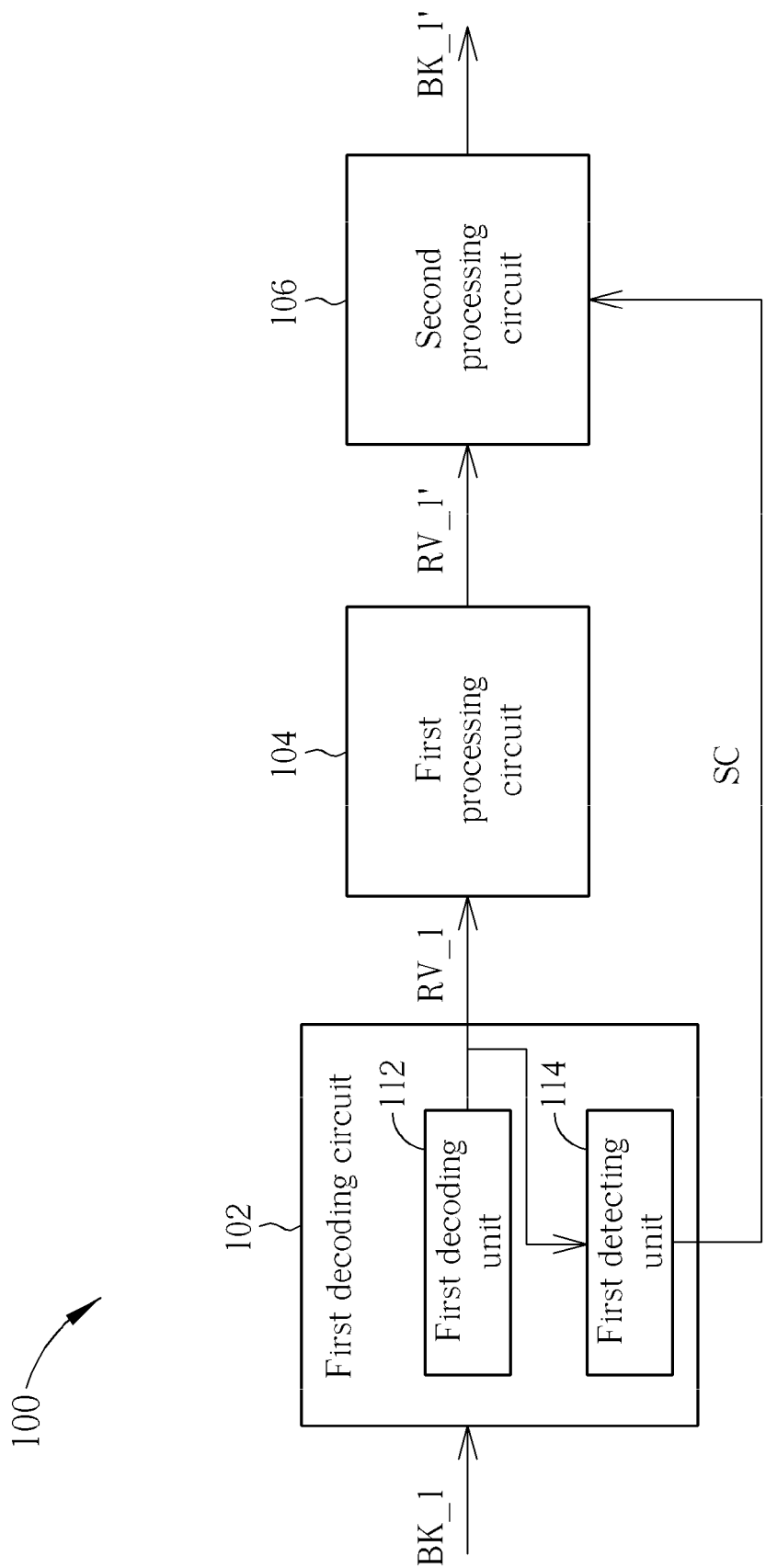
FIG. 1 is a block diagram illustrating a generalized video decoding apparatus according to an exemplary embodiment of the present invention.

FIG. 1 is a block diagram illustrating a generalized video decoding apparatus according to an exemplary embodiment of the present invention. The video decoding apparatus 100 includes, but is not limited to, a first decoding circuit 102, a first processing circuit 104, and a second processing circuit 106. In this exemplary embodiment, the first decoding circuit 102 includes a first decoding unit 112 and a first detecting unit 114, wherein the first decoding unit 112 is configured for decoding a first encoded block BK_1 to generate first residual values (e.g., quantized transform coefficients) RV_1, and the first detecting unit 114 is configured for detecting whether all of the first residual values RV_1 have the same first value (e.g., zero). The first processing circuit 104 is coupled to the first decoding unit 112, and configured for processing the first residual values RV_1 to generate first processed residual values RV_1'. The second processing circuit 106 is coupled to the first processing circuit 104 and the first detecting unit 114, and configured for generating a decoded block BK_1' corresponding to the first encoded block BK_1. It should be noted that the block size of each block checked by the first detecting unit 114 depends on the coding scheme actually used. For example, the block size may be 4×4 or 2×2; however, this is for illustrative purposes only, and is not meant to be a limitation of the present invention.

When the first detecting unit 114 detects that all of the first residual values RV_1 derived from the first encoded block BK_1 have the same first value (e.g., zero), the first detecting unit 114 generates a control signal SC for controlling the second processing circuit 106 to generate the decoded block BK_1' without referring to the first processed residual values RV_1'. That is, the first processed residual values RV_1' are not indispensable to derivation of the decoded block BK_1' when all of the first residual values RV_1 are found having the same first value (e.g., zero). More specifically, when all of the first residual values RV_1 have the same first value (e.g., zero), the first processed residual values RV_1' generated from the first processing circuit 104 is predictable and can be known beforehand. Therefore, the first processing circuit 104 is allowed to skip the processing of the first residual values RV_1. Considering a case where all of the first residual values RV_1 are 0's, processing of the first residual values RV_1 and/or buffering of the first processed residual values RV_1' can be bypassed/skipped as all of the first processed residual values RV_1' are also 0's and thus have no effect upon the derivation of the decoded block BK_1'. In this way, the decoding performance is improved greatly.

Figure 2:
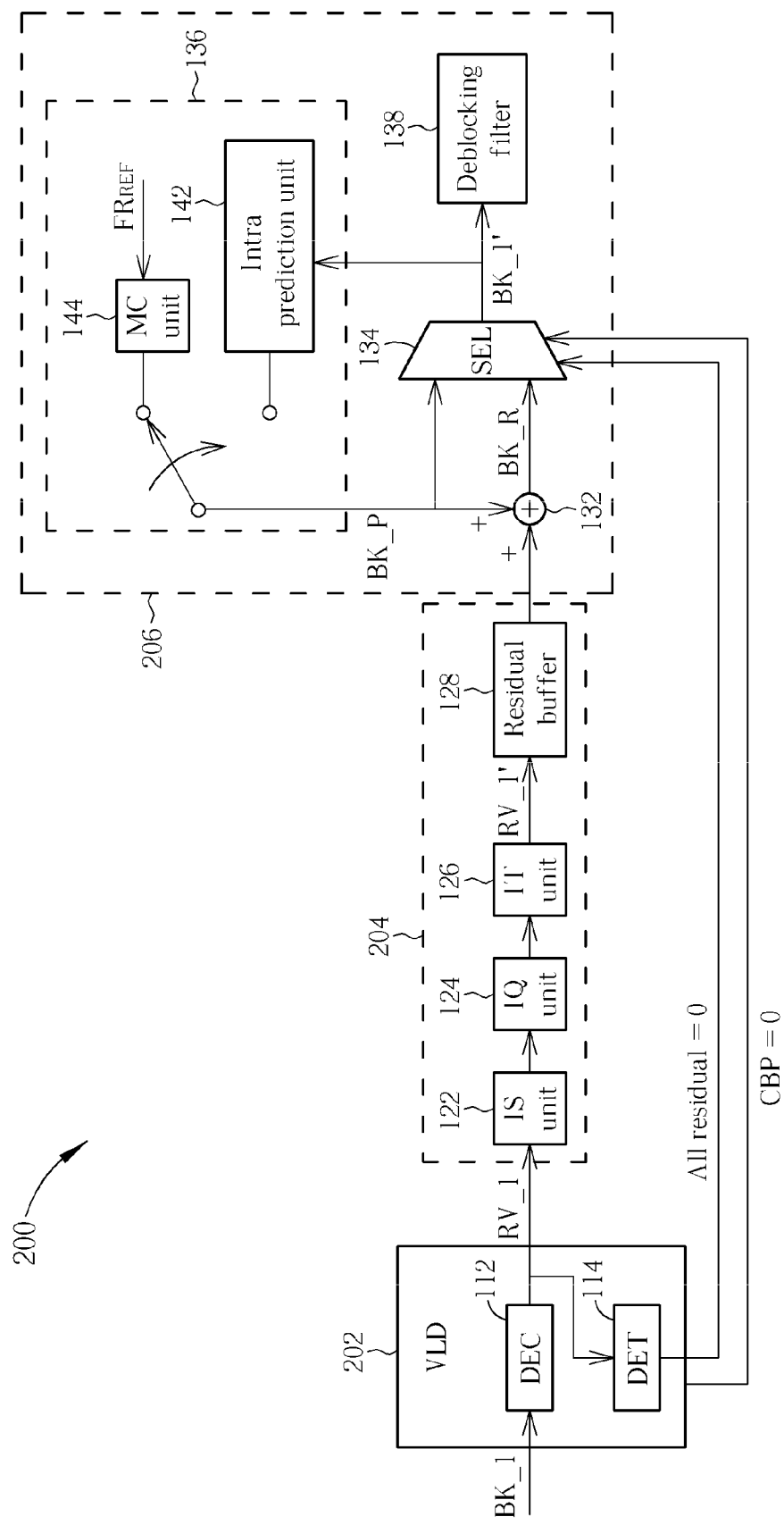
FIG. 2 is a block diagram illustrating a first exemplary implementation based on the decoder architecture shown in FIG. 1.

Please refer to FIG. 2, which is a block diagram illustrating a first exemplary implementation based on the decoder architecture shown in FIG. 1. The exemplary video decoding apparatus 200 includes an entropy decoding circuit such as a variable length decoder (VLD) 202 that realizes the first decoding circuit 102 shown in FIG. 1, a first processing circuit 204 that realizes the first processing circuit 104 shown in FIG. 1, and a second processing circuit 206 that realizes the second processing circuit 106 shown in FIG. 1. The VLD 202 includes a decoder (DEC) 212 that realizes the first decoding unit 112 and a detector (DET) 214 that realizes the first detecting unit 114. In this exemplary embodiment, the first processing circuit 104 includes an inverse scan (IS) unit 122, an inverse quantization (IQ) unit 124, an inverse transform (IT) unit 126, and a residual buffer 128. After the first residual values RV_1 of the first encoded block BK_1 are generated from the DEC 112 to the first processing circuit 204, the first residual values RV_1 may be processed by the IS unit 122, the IQ unit 124, and the IT unit 126. Next, the IT unit 126 outputs the first processed residual values RV_1' to the residual buffer 128. In a case where the block size of the first block BK_1 is 4×4, the number of the first residual values RV_1/first processed residual values RV_1' is equal to 16. Therefore, the residual buffer 128 may need 16 buffer write cycles for buffering the first processed residual values RV_1'.

Regarding the second processing circuit 206, it includes a summation unit (e.g., an adder) 132, a selector (SEL) 134, an intra/inter prediction unit 136, and an optional deblocking filter 138. The intra/inter prediction unit 136 may provide a predicted frame BK_P by either intra-prediction or inter-prediction. When intra-prediction mode is enabled, the intra-prediction unit 142 is responsible for generating the predicted frame BK_P. When inter-prediction mode is enabled, the motion compensation (MC) unit 144 is responsible for generating the predicted frame BK_P according to at least one reference frame $FR_{REF}$. After the predicted block BK_P corresponding to the first encoded block BK_1 is available, the summation unit 132 generates a reconstructed block BK_R by combining/summing up the predicted block BK_P and the first processed residual values RV_1' read from the residual buffer 128. The selector 134 is configured to selectively output the reconstructed block BK_R or the predicted block BK_P as a decoded block BK_1' corresponding to the first encoded block BK_1. The optional deblocking filter 138 may be implemented to improve visual quality and prediction performance by smoothing the sharp edges present at block boundaries.

In this exemplary embodiment, when the DET 114 finds that all of the first residual values RV_1 are 0's, the DET 114 controls the SEL 134 to directly output the predicted block BK_P as the decoded block BK_1', and stops the first processing circuit 204 from processing the first residual values, each being a zero residual, and/or buffering the first processed residual values, each being a zero residual, into the residual buffer 128. As the residual buffer 128 is not required to buffer any residual value derived from decoding the first encoded block BK_1, the buffer write cycles are saved. Besides, the summation operation configured for generating the reconstructed block BK_R is allowed to be bypassed. In this way, the overall performance of the video decoding apparatus 200 is improved when the proposed block skip mode is enabled.

In this exemplary embodiment, the video bitstream to be decoded by the video decoding apparatus 200 complies with a coding scheme supporting the use of coded block patters. In general, the DEC 112 would parse the incoming video bitstream, and obtain a CBP bit corresponding to the first encoded block BK_1 prior to deriving the first residual values RV_1 from the first encoded block BK_1. When the CBP bit is equal to zero, implying that all of the first residual values RV_1 are 0's, the VLD 202 may disable the DET 114 and control the SEL 134 to directly output the predicted block BK_P as the decoded block BK_1' for skipping the decoding operation of the first encoded block BK_1. In other words, only when a CBP bit corresponding to the first encoded block BK_1 is equal to one, the decoded block BK_1' is processed by the DEC 112, and the DET 114 is activated to check the first residual values RV_1 generated from the DEC 112.

It should be noted that the decoder architecture shown in FIG. 2 may also be applicable to decoding the first encoded block BK_1 that is derived from a base layer frame complying with a scalable video coding (SVC) scheme, which will be detailed later.

Figure 3:
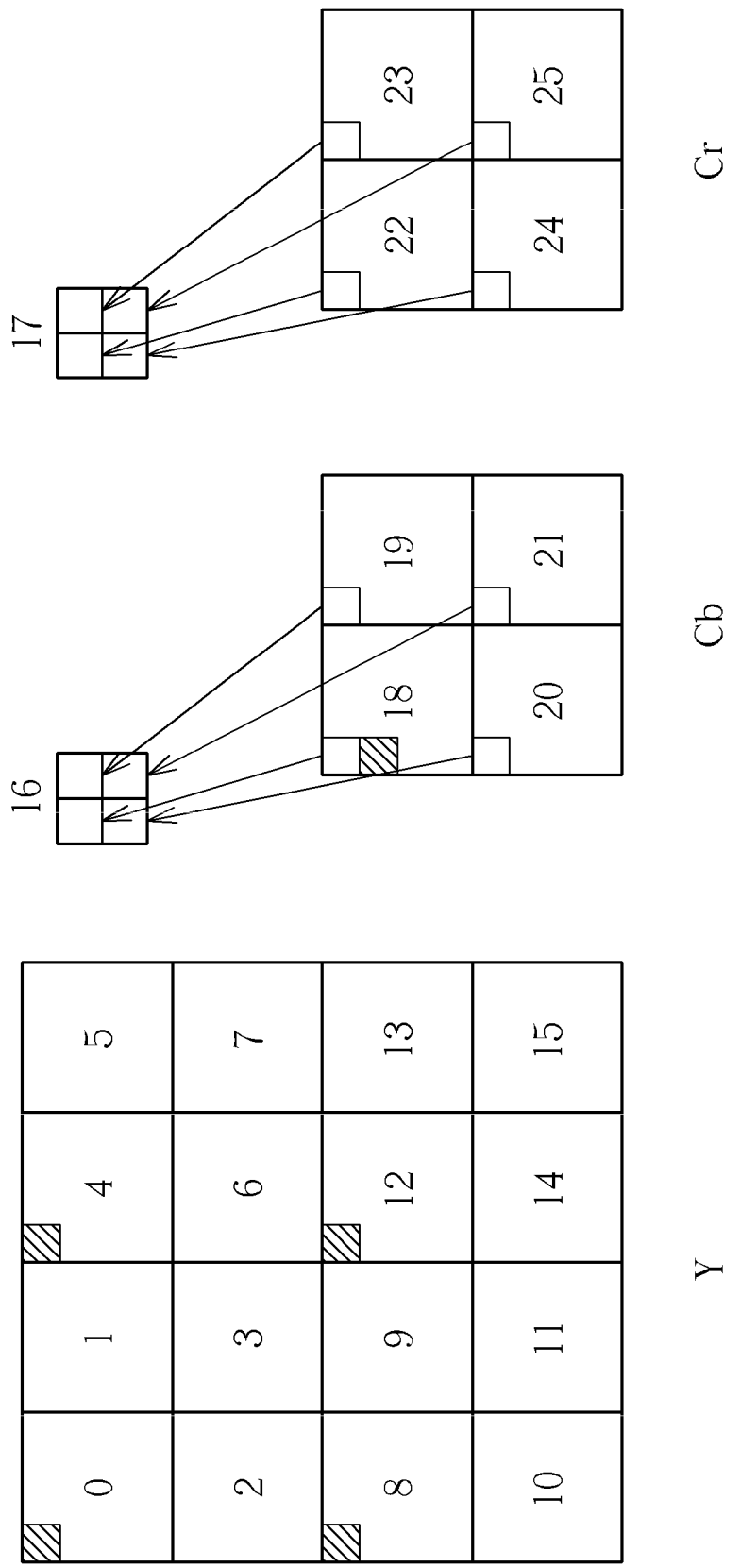
FIG. 3 is a diagram illustrating an example of decoding a macroblock by using the video decoding apparatus 200 shown in FIG. 2.

Please refer to FIG. 3, which is a diagram illustrating an example of decoding a macroblock by using the video decoding apparatus 200 shown in FIG. 2. Consider a case where a 4×4 intra macroblock mode is used. Thus, a macroblock may include a 16×16 luma block Y and two 8×8 chroma blocks Cb, Cr. As shown in the figure, there are 24 4×4 blocks indexed by 0-15 and 18-25 and two 2×2 blocks indexed by 16 and 17, where only the 4×4 blocks indexed by 0, 4, 8, 12, and 18 have non-zero residual values represented by the shaded squares. Therefore, the CBP corresponding to the macroblock to be decoded would have 6 bits that record a decimal value 47 (i.e., CBP=$B_5B_4B_3B_2B_1B_0$=101111). It should be noted that the CBP bit $B_0$ is used to indicate whether the 8×8 block, including 4×4 blocks indexed by 0-3, contains non-zero residual value(s); the CBP bit $B_1$ is used to indicate whether the 8×8 block, including 4×4 blocks indexed by 4-7, contains non-zero residual value(s); the CBP bit $B_2$ is used to indicate whether the 8×8 block, including 4×4 blocks indexed by 8-11, contains non-zero residual value(s); the CBP bit $B_3$ is used to indicate whether the 8×8 block, including 4×4 blocks indexed by 12-15, contains non-zero residual value(s); the CBP bit $B_4$ is used to indicate whether the 2×2 blocks indexed by 16 and 17 contain non-zero residual value(s); and the CBP bit $B_5$ is used to indicate whether the 2×2 blocks indexed by 16-17 and 4×4 block indexed by 18-25 contain non-zero residual value (s). Regarding a conventional decoder design, all of the 4×4 blocks indexed by 0-15 and 18-25 need to be processed by inverse scan, inverse quantization, and inverse transform and the derived residual values need to be stored into a residual buffer due to the CBP bits $B_5$, $B_3$, $B_2$, $B_1$, $B_0$ are 1's. In contrast to the conventional decoder design, the DET 114 of the video decoding apparatus 200 would detect that only 4×4 blocks indexed by 0, 4, 8, 12, and 18 have non-zero residual values, and the remaining 4×4 blocks indexed by 1-3, 5-7, 9-11, 13-15, 19-25 and the 2×2 blocks indexed by 16-17 only have zero residual values. Thus, the processing and/or buffering of these detected blocks only having zero residual values would be skipped. Compared to the conventional decoder design, the video decoding apparatus 200 therefore has better decoding performance.

Figure 4:
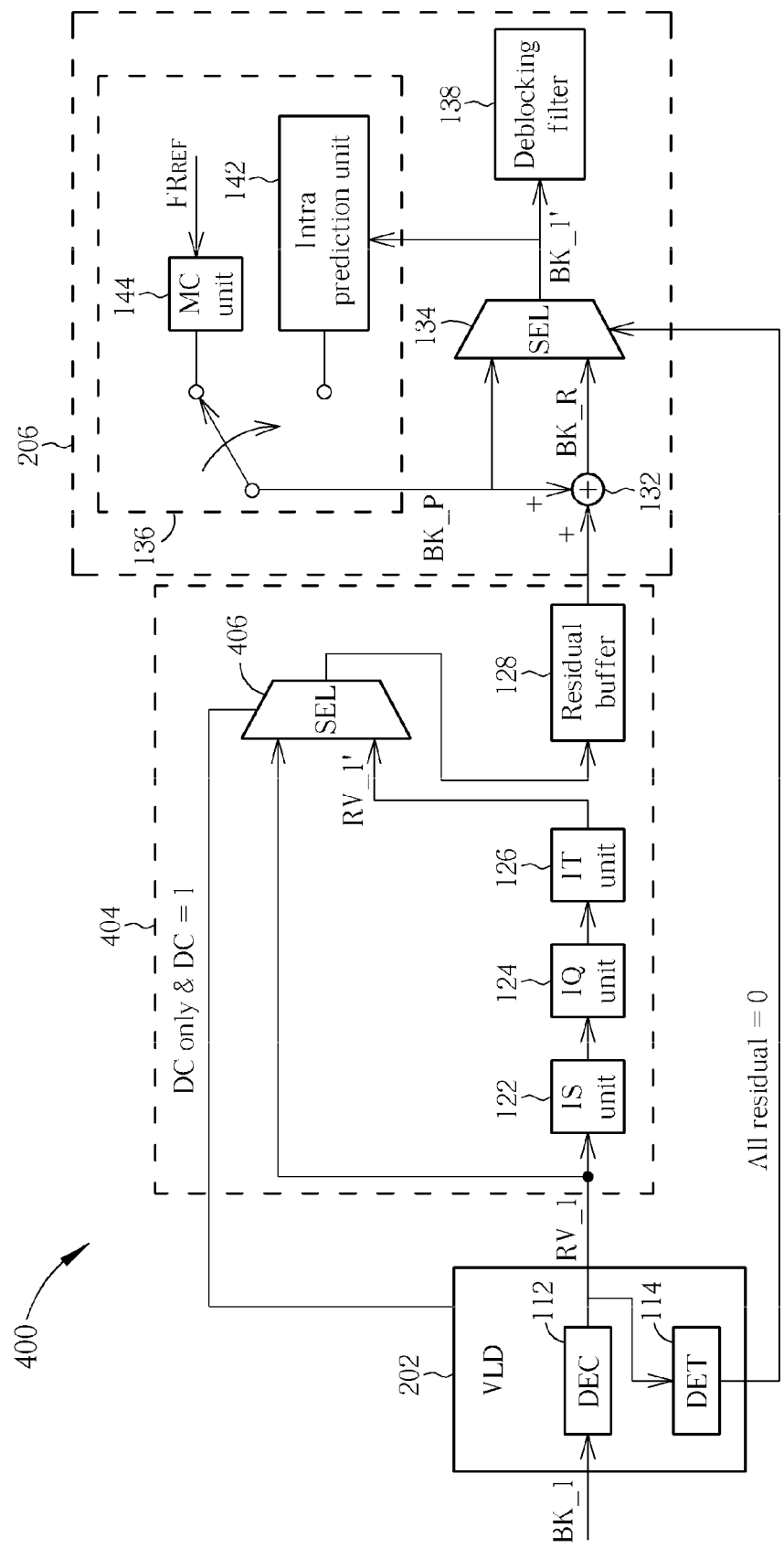
FIG. 4 is a block diagram illustrating a second exemplary implementation based on the decoder architecture shown in FIG. 1.

Please refer to FIG. 4, which is a block diagram illustrating a second exemplary implementation based on the decoder architecture shown in FIG. 1. The major difference between the exemplary video decoding apparatuses 200 and 400 is the design of the first decoding circuit 404 shown in FIG. 4. The first decoding circuit 404 includes a selector 406 and the aforementioned IS unit 122, IQ unit 124, IT unit 126, and residual buffer 128. The video decoding apparatus 400 is used for decoding a video bitstream complying with a coding scheme that does not use CBP. For example, the first encoded block BK_1 is derived from a VP8 video bitstream. In this exemplary embodiment, when the VLD 112 finds that the first encoded block BK_1 only has one non-zero DC residual value, a DC mode is enabled. Therefore, the SEL 406 outputs the first residual values RV_1 to the residual buffer 128. When the first residual values RV_1 have non-zero residual values, the SEL 406 outputs the first processed residual values RV_1' to the residual buffer 128. When the DET 114 detects that the first encoded block BK_1 only has one zero DC residual value or all of the residual values are 0's, the DET 114 controls the SEL 134 to select the predicted block BK_P as the decoded block BK_1'. The processing of the first residual values RV_1 and/or the buffering of the first processed residual values RV_1' can be skipped. The same objective of improving the decoding performance is achieved.

Figure 5:
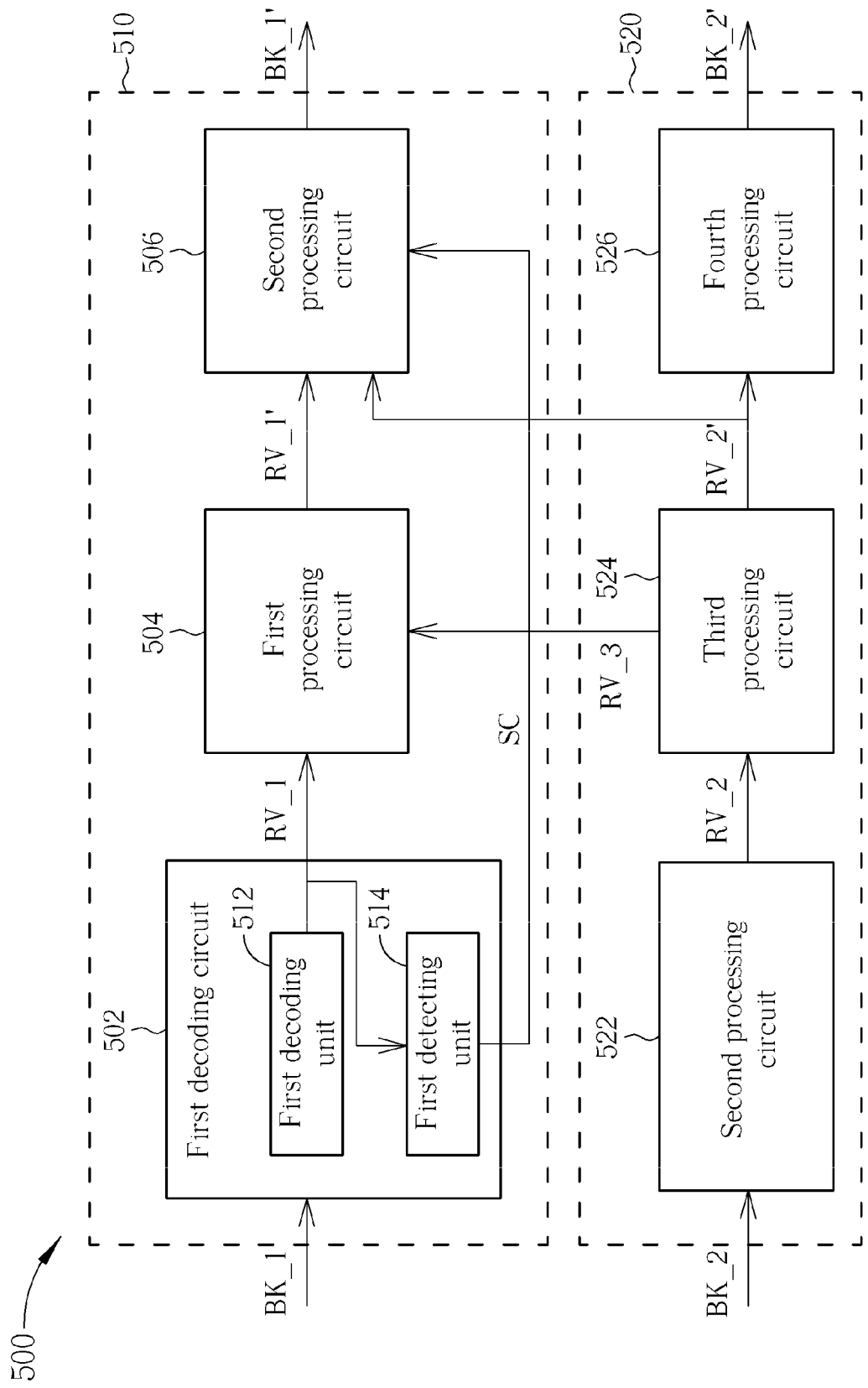
FIG. 5 is a block diagram illustrating another generalized video decoding apparatus according to an exemplary embodiment of the present invention.

FIG. 5 is a block diagram illustrating another generalized video decoding apparatus according to an exemplary embodiment of the present invention. The video decoding apparatus 500 is devised to decoding a video bitstream complying with an H.264/SVC scheme, and therefore includes an enhancement layer (EL) decoding block 510 and a base layer (BL) decoding block 520. As shown in FIG. 5, the EL decoding block 510 has the decoder architecture shown in FIG. 1, and therefore includes a first decoding circuit 502, a first processing circuit 504, and a second processing circuit 506, wherein the first decoding circuit 502 includes a first decoding unit 512 and a first detecting unit 514. Regarding the BL decoding block 520, it includes, but is not limited to, a second decoding circuit 522, a third processing circuit 524, and a fourth processing circuit 526. Please note that the BL decoding block 520 may also employ the decoder architecture shown in FIG. 1, depending upon the actual design consideration.

The first decoding unit 512 is configured for decoding a first encoded block BK_1, derived from an EL frame, to generate first residual values RV_1. The first detecting unit 514 is configured for detecting whether all of the first residual values RV_1 have the same first value (e.g., zero). The first processing circuit 504 is configured for generating first processed residual values RV_1' according to the first residual values RV_1 provided by the first decoding unit 512 and inter-layer residual values RV_3 provided by the third processing circuit 524. The second processing circuit 506 is configured for generating a decoded block BK_1' corresponding to the first encoded block BK_1.

The second decoding unit 522 is configured for decoding a second encoded block BK_2, derived from a BL frame, to generate second residual values (e.g., quantized transform coefficients) RV_2. The third processing circuit 524 is configured for processing the second residual values RV_2 to generate second processed residual values RV_2'. It should be noted that the aforementioned inter-layer residual values RV_3 are obtained during the decoding process of the second residual values RV_2. The fourth processing circuit 526 is configured to generating a decoded block BK_2' corresponding to the second encoded block BK_2.

When the first detecting unit 514 detects that all of the first residual values RV_1 derived from the first encoded block BK_1 have the same first value (e.g., zero), the first detecting unit 514 generates a control signal SC for controlling the second processing circuit 506 to generate the decoded block BK_1' without referring to the first processed residual values RV_1'. For example, the second processed residual values RV_2' may be referenced by the second processing circuit 506 for generating the decoded block BK_1'. Considering a case where all of the first residual values RV_1 are 0's, processing of the first residual values RV_1 and/or buffering of the first processed residual values RV_1' can be bypassed/skipped as all of the first processed residual values RV_1' would be 0's and thus have no effect upon the derivation of the decoded block BK_1'.

Figure 6:
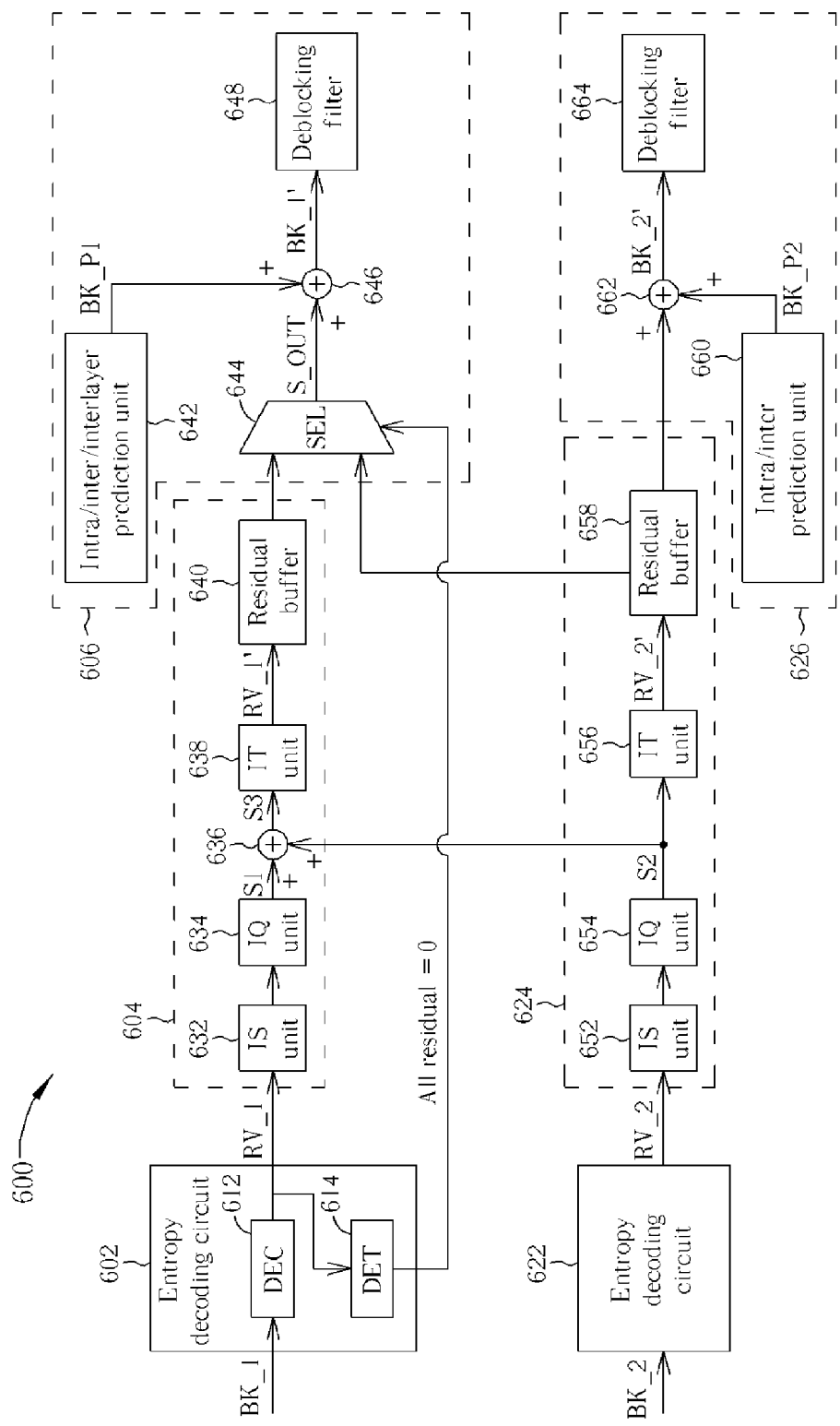
FIG. 6 is a block diagram illustrating a first exemplary implementation based on the decoder architecture shown in FIG. 5.

Based on the decoder architecture shown in FIG. 5, several exemplary implementations are feasible. Please refer to FIG. 6, which is a block diagram illustrating a first exemplary implementation based on the decoder architecture shown in FIG. 5. The exemplary video decoding apparatus 600 includes entropy decoding circuits 602 and 622 that realizes the first decoding circuit 502 and the second decoding circuit 522 shown in FIG. 5, a first processing circuit 604 that realizes the first processing circuit 504 shown in FIG. 5, a second processing circuit 606 that realizes the second processing circuit 506 shown in FIG. 5, a third processing circuit 624 that realizes the third processing circuit 524 shown in FIG. 5, and a fourth processing circuit 626 that realizes the fourth processing circuit 526 shown in FIG. 5. The entropy decoding circuit 602 includes a decoder (DEC) 612 that realizes the first decoding unit 512, and a detector (DET) 614 that realizes the first detecting unit 514. In this exemplary embodiment, the first processing circuit 604 includes an inverse scan (IS) unit 632, an inverse quantization (IQ) unit 634, a summation unit 636, an inverse transform (IT) unit 636, and a residual buffer 640. The second processing circuit 606 includes an intra/inter/interlayer prediction unit 642, a selector (SEL) 644, a summation unit 646, and an optional deblocking filter 648. The third processing circuit 624 includes an IS unit 652, an IQ unit 654, an IT unit 656, and a residual buffer 658. The fourth processing circuit 626 includes an intra/inter prediction unit 660, a summation unit 662, and an optional deblocking filter 664.

Suppose that an H.264/SVC video stream is generated by a medium-grain scalable (MGS) coding scheme. After the first residual values RV_1 of the first encoded block BK_1 are generated from the DEC 612 to the first processing circuit 604, the first residual values RV_1 are processed by the IS unit 632 and the IQ unit 634. Similarly, after the second residual values RV_2 of the second encoded block BK_2 are generated from the entropy decoding circuit 622 to the third processing circuit 624, the second residual values RV_2 are processed by the IS unit 652 and the IQ unit 654.

In a case where the first encoded block BK_1 and the second encoded block BK_2 are not derived from key frames defined by the MGS coding scheme, the decoding of the second encoded block BK_2 is terminated at the successful derivation of the second IQ output S2. That is, the IQ unit 654 generates the second IQ output S2 to the summation unit 636 of the first processing circuit 604, and the following IT unit 656 is not required to process the second IQ output S2. Thus, no second processed residual values RV_2' are generated and stored into the residual buffer 658. It is self-explanatory that the fourth processing circuit 626 is not required to generate the decoded block BK_2' corresponding to the second encoded block BK_2. The summation 636 combines the first IQ output S1 provided by the IQ unit 634 and the second IQ output S2 provided by the IQ unit 654, and accordingly generates a third IQ output S3 to the following IT unit 638. The IT unit 638 performs inverse transform upon the third IQ output S3, and stores the obtained first processed residual values RV_1' to the residual buffer 640. The SEL 644 outputs the first processed residual values RV_1' as a selected output S_OUT. The summation unit 646 therefore generates the decoded block BK_1' by combining/summing up the selected output S_OUT and a predicted block BK_P1 provided by the intra/inter/interlayer prediction unit 642. It should be noted that the predicted block BK_P1 may be derived from intra-prediction, inter-prediction (e.g., motion compensation), or interlayer prediction. Besides, the decoded block BK_1' may be further processed by the deblocking filter 648 for better visual quality.

In another case where the first encoded block BK_1 and the second encoded block BK_2 are derived from key frames defined by the MGS coding scheme. Both of the second processing circuit 606 and fourth processing circuit 626 are required to generate and output the decoded blocks BK_1' and BK_2'. Therefore, after the second IQ output S2 is generated from the IQ unit 654, the IT unit 656 is operative to perform inverse transform upon the second IQ output S2, and store the second processed residual values RV_2' to the residual buffer 658. Next, the summation unit 662 generates the decoded block BK_2' by combining/summing up the second processed residual values RV_2' and a predicted block BK_P2 provided by the intra/inter prediction unit 662. It should be noted that the predicted block BK_P2 may be derived from intra-prediction or inter-prediction (e.g., motion compensation). Besides, the decoded block BK_2' may be further processed by the deblocking filter 664 for better visual quality.

Regarding the decoding of the first encoded block BK_1, the detector DET 614 checks if all of the first residual values RV_1 are 0's. When the first residual values RV_1 include one or more non-zero values, the first processing circuit 604 is operative to process the first residual values RV_1 and store the first processed residual values RV_1' into the residual buffer 640. Besides, the selector SEL 644 outputs the first processed residual values RV_1' as the selected output S_OUT. When the detector DET 614 finds that all of the first residual values RV_1 are 0's, the detector DET 614 controls the selector SEL to select the second residual values RV_2' as the selected output S_OUT. As all of the first residual values RV_1 are 0's, the third IQ output S3 is identical to the second IQ output S2 as the first IQ output S1 would have zero values only. Thus, the first processed residual values RV_1' derived from performing inverse transform upon the third IQ output S3 are identical to the second processed residual values RV_2' derived from performing inverse transform upon the second IQ output S2. Based on such observation, the present invention therefore proposes bypassing/skipping the processing of the first residual values RV_1 and buffering of the first processed residual values RV_1' by directly using the second processed residual values RV_2' as an output of the first processing circuit 604. The decoding performance of the video decoding apparatus 600 is improved due to the proposed block skip mode.

Figure 7:
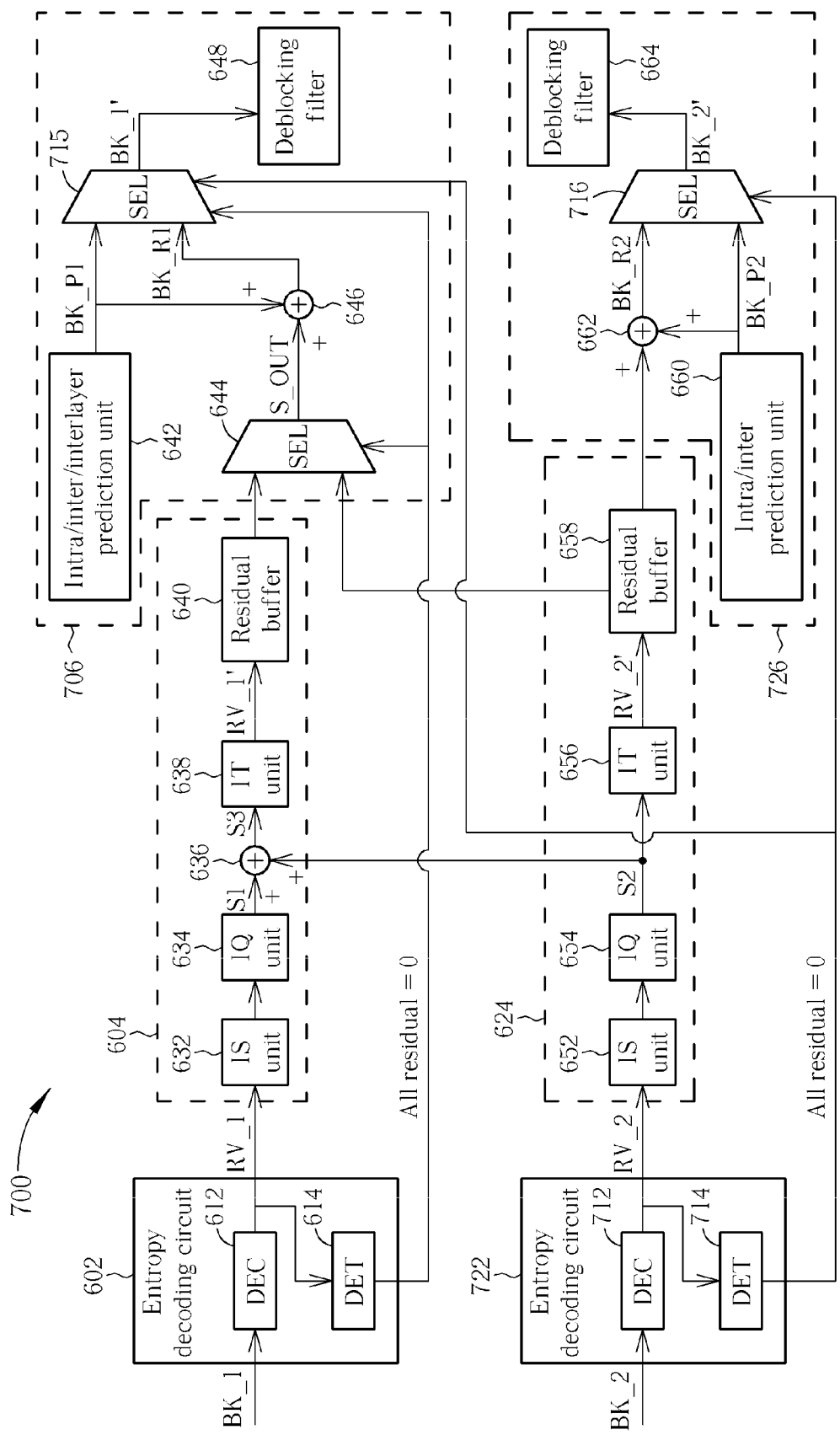
FIG. 7 is a block diagram illustrating a second exemplary implementation based on the decoder architecture shown in FIG. 5.

Please refer to FIG. 7, which is a block diagram illustrating a second exemplary implementation based on the decoder architecture shown in FIG. 5. As mentioned above, the BL decoding block 520 may also employ the decoder architecture shown in FIG. 1, depending upon the actual design consideration. Thus, the major difference between the video decoding apparatuses 700 and 600 is the design of the entropy decoding circuit 722, the second processing circuit 706, and the fourth processing circuit 726. As shown in FIG. 7, the entropy decoding circuit 722 includes a decoder (DEC) 712 and a detector (DET) 714, wherein the DEC 712 is configured for decoding the second encoded block BK_2 to generate the second residual values RV_2, and the DET 714 is configured for detecting whether all of the second residual values have the same value (e.g., zero). The selector (SEL) 716 is configured to select a second reconstructed block BK_R2 generated from the summation unit 662 or the second predicted block BK_P2 generated from the intra/inter prediction unit 660 as the decoded block BK_2'. More specifically, the BL decoding block implemented using the entropy decoding circuit 722, the third processing circuit 624, and the fourth processing circuit 726 has the same decoder architecture employed by the video decoding apparatus 200 shown in FIG. 2. Consider a case where the second encoded block BK_2 is derived from a key frame defined by the MGS coding scheme. When the DET 714 finds that the second residual values RV_2 have one or more non-zero values, the SEL 716 outputs the second reconstructed block BK_R2 as the decoded block BK_2'. However, when the DET 714 finds that all of the second residual values RV_2 are 0's, the DET 714 controls the SEL 716 to output the second predicted block BK_P2 as the decoded block BK_2'. In this way, the decoding of the second residual values RV_2 and/or the buffering of the second processed residual values RV_2' can be skipped/bypassed to improve the overall decoding performance.

Regarding the SEL 715 of the second processing circuit 706, it is configured to select a first reconstructed block BK_R1 generated from the summation unit 646 or the first predicted block BK_P1 generated from the intra/inter/inter-layer prediction unit 642 as the decoded block BK_1'. Consider a case where the first encoded block BK_1 and the second encoded block BK_2 are derived from key frames defined by the MGS coding scheme. When the DET 614 finds that the first residual values RV_1 have one or more non-zero values, and/or the DET 714 finds that the second residual values RV_2 have one or more non-zero values, the SEL 715 outputs the first reconstructed block BK_R1 as the decoded block BK_1'. However, when the DET 614 finds that all of the first residual values RV_1 are 0's and the DET 714 finds that all of the second residual values RV_2 are 0's, it implies that all of the first processed residual values RV_1' and second processed residual values RV_2' would be 0's. Thus, the selected output S_OUT has no effect on derivation of the first predicted block BK_P1 when combined with the first predicted block BK_P1 at the summation unit 646. Therefore, the SEL 715 directly outputs the first predicted block BK_P1 as the decoded block BK_1'. In this way, the decoding of the first residual values RV_1 and/or the buffering of the first processed residual values RV_1' can be skipped/bypassed to improve the overall decoding performance.

Similarly, regarding another case where the first encoded block BK_1 and the second encoded block BK_2 are not derived from key frames defined by the MGS coding scheme, the SEL 715 directly outputs the first predicted block BK_P1 as the decoded block BK_1' when the DET 614 finds that all of the first residual values RV_1 are 0's and the DET 714 finds that all of the second residual values RV_2 are 0's. In this way, the decoding of the first residual values RV_1 and/or the buffering of the first processed residual values RV_1' can be skipped/bypassed to improve the overall decoding performance.

Please note that elements included in the exemplary video decoding apparatuses may be realized using pure hardware or software executed by processor(s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video decoding apparatus, comprising:
   a first decoding circuit, realized with an entropy decoding circuit, the first decoding circuit comprising:
   a first decoding unit, configured for decoding a first encoded block to generate first residual values, wherein the first residual values are directly outputted from the first decoding unit; and
   a first detecting unit, only when a coded block pattern (CBP) bit corresponding to the first encoded block is equal to one, the first detecting unit is activated to detect whether all of the first residual values have a same first value;
   a first processing circuit, coupled to the first decoding unit and configured for processing the first residual values to generate first processed residual values; and
   a second processing circuit, coupled to the first processing circuit and the first detecting unit, wherein when the first detecting unit detecting all of the first residual values have the same first value, the second processing circuit is configured for generating a decoded block corresponding to the first encoded block by skipping processing the first residual values.

2. The video decoding apparatus of claim 1, wherein the first value is equal to zero.

3. The video decoding apparatus of claim 1, wherein the second processing circuit comprises:
   a summation unit, coupled to the first processing circuit and configured for generating a reconstructed block by combining a predicted block and the first processed residual values; and
   a selector, coupled to the summation unit and configured for selecting the reconstructed block or the predicted block as the decoded block, wherein when all of the first residual values have the same first value, the first detecting unit controls the selector to output the predicted block as the decoded block.

4. The video decoding apparatus of claim 1, wherein when all of the first residual values have the same first value, the first detecting unit further stops the first processing circuit from processing the first residual values and/or buffering the first processed residual values.

5. The video decoding apparatus of claim 1, wherein the first encoded block is derived from an enhancement layer (EL) frame complying with a scalable video coding (SVC) scheme, and the second processing circuit comprises:
   a selector, coupled to the first processing circuit and configured for selecting the first processed residual values or second processed residual values as a selected output, wherein the second processed residual values correspond to a second encoded block derived from a base layer (BL) frame paired with the EL frame, and when all of the first residual values have the same first value, the first detecting unit controls the selector to output the second processed first residual values as the selected output; and
   a summation unit, coupled to the selector and configured for generating the decoded block by combining a predicted block and the selected output.

6. The video decoding apparatus of claim 5, wherein the BL frame and the EL frame are key frames in medium-grain quality scalable (MGS) coding.

7. The video decoding apparatus of claim 1, wherein the first encoded block is derived from an enhancement layer (EL) frame complying with a scalable video coding (SVC) scheme, and the video decoding apparatus further comprises:
   a second decoding circuit, comprising:
   a second decoding unit, configured for decoding a second encoded block to generate second residual values, wherein the second encoded block is derived from a base layer (BL) frame paired with the EL frame; and
   a second detecting unit, configured for detecting whether all of the second residual values have a same second value;
   wherein when all of the first residual values have the same first value and all of the second residual values have the same second value, the second processing circuit directly outputs a predicted block corresponding to the first encoded block as the decoded block.

8. The video decoding apparatus of claim 7, wherein each of the first value and the second value is equal to zero.

9. The video decoding apparatus of claim 1, wherein the first processing circuit comprises:
   an inverse scan (IS) unit, coupled to the first decoding unit;
   an inverse quantization (IQ) unit, coupled to the IS unit; and an inverse transform (IT) unit, coupled to the IQ unit, wherein the first residual values are processed by the IS unit, the IQ unit, and the IT unit.

10. A video decoding method, comprising:
decoding a first encoded block to generate first residual values by utilizing a first decoding unit positioned within a first decoding circuit, wherein the first decoding circuit is realized with an entropy decoding circuit, and the first residual values are directly outputted from the first decoding unit;
only when a coded block pattern (CBP) bit corresponding to the first encoded block is equal to one, activating a detecting unit positioned within the first decoding circuit to detect whether all of the first residual values have a same first value; and
when it is determined that all of the first residual values have the same first value, generating a decoded block corresponding to the first encoded block by skipping processing the first residual values.

11. The video decoding method of claim 10, wherein the first value is equal to zero.

12. The video decoding method of claim 10, wherein the step of generating the decoded block corresponding to the first encoded block without referring to first processed residual values comprises:
bypassing a summation operation configured for generating a reconstructed block by combining a predicted block and the first processed residual values; and
selecting the predicted block as the decoded block.

13. The video decoding method of claim 10, further comprising:
when all of the first residual values have the same first value, not processing the first residual values and/or not buffering the first processed residual values.

14. The video decoding method of claim 10, wherein the first encoded block is derived from an enhancement layer (EL) frame complying with a scalable video coding (SVC) scheme, and the step of generating the decoded block corresponding to the first encoded block without referring to first processed residual values comprises:
selecting second processed residual values as a selected output by bypassing a processing operation configured for processing the first residual values to generate first processed residual values, wherein the second processed residual values correspond to a second encoded block derived from a base layer (BL) frame paired with the EL frame; and
generating the decoded block by combining a predicted block and the selected output.

15. The video decoding method of claim 10, wherein the first encoded block is derived from an enhancement layer (EL) frame complying with a scalable video coding (SVC) scheme, and the method further comprises:
decoding a second encoded block to generate second residual values, wherein the second encoded block is derived from a base layer (BL) frame paired with the EL frame; and
detecting whether all of the second residual values have a same second value;
wherein the step of generating the decoded block corresponding to the first encoded block without referring to first processed residual values comprises:
when all of the first residual values have the same first value and all of the second residual values have the same second value, directly outputting a predicted block corresponding to the first encoded block as the decoded block.

16. The video decoding method of claim 15, wherein each of the first value and the second value is equal to zero.

17. The video decoding method of claim 15, wherein the BL frame and the EL frame are key frames in medium-grain quality scalable (MGS) coding.

18. The video decoding method of claim 10, further comprising:
processing the first residual values to generate the first processed residual values by utilizing a first processing unit, wherein the first processing unit comprises:
an inverse scan (IS) unit, coupled to the first decoding unit;
an inverse quantization (IQ) unit, coupled to the IS unit; and
an inverse transform (IT) unit, coupled to the IQ unit, wherein the first residual values are processed by the IS unit, the IQ unit, and the IT unit.

* * * * *